United States Statutory Invention Registration [19]

[11] Reg. Number: H970

Snyder et al.

[43] Published: Oct. 1, 1991

[54] INTEGRATED DECONTAMINATION PROCESS FOR METALS

[75] Inventors: Thomas S. Snyder, Oakmont; Graham A. Whitlow, Murrysville, both of Pa.

[73] Assignee: The United States of America as represented by the United States Department of Energy, Washington, D.C.

[21] Appl. No.: 363,019

[22] Filed: Jun. 8, 1989

[51] Int. Cl.[5] ..... C25C 1/00; C25C 1/06; C25C 1/12

[52] U.S. Cl. ..... 204/105 R; 204/106; 204/112; 75/393; 423/DIG. 20

[58] Field of Search ..... 204/1.5, 106, 107, 108, 204/112, 113, 105 R; 75/84.1 A, 84.1 R, 65 R, 65 EB, 65 Z, 93 A, 93 R

[56] References Cited

U.S. PATENT DOCUMENTS

| | | | |
|---|---|---|---|
| 2,111,575 | 3/1938 | Stack | 204/106 |
| 2,393,582 | 1/1946 | Agnew | 204/113 |
| 4,351,705 | 9/1982 | Ernst | 204/108 |
| 4,395,367 | 7/1983 | Rohrmann et al. | 75/84.1 A |

*Primary Examiner*—Robert L. Stoll
*Assistant Examiner*—Daniel S. Metzmaier
*Attorney, Agent, or Firm*—Katherine P. Lovingood; Stephen D. Hamel; William R. Moser

[57] ABSTRACT

An integrated process for decontamination of metals, particularly metals that are used in the nuclear energy industry contaminated with radioactive material. The process combines the processes of electrorefining and melt refining to purify metals that can be decontaminated using either electrorefining or melt refining processes.

1 Claim, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

INTEGRATED DECONTAMINATION PROCESS FOR METALS

This invention was developed under a contract with the U.S. Department of Energy, Contract No. DE-AC05-86-OR-21670.

This invention relates to decontamination of metals, particularly metals that are used in the nuclear energy industry contaminated with radioactive material.

BACKGROUND OF THE INVENTION

The nuclear community, both commercial and governmental, contaminates a large quantity of metals and alloys annually. Some of the contamination is only surface while other is blended homogeneously through the metal. Rather than discard the contaminated materials, there are several incentives to decontaminate them for recycle.

There are economic motivations that make recycling attractive. If an inexpensive method for decontamination could be found, high quality material could be made at a fraction of the cost that conversion from ore would require. Strategic resources such as cobalt, chromium, nickel, aluminum, zirconium and titanium could be recovered.

Postutilization storage costs would also be less since material that would ordinarily be placed in a containment repository could be reused. This avoids the need for both preliminary containment processing as well as continued inventory and control of the waste. Circumventing waste containment also has an environmental payoff since storage of contaminated materials risks the danger of their spread by water runoff, wind or natural catastrophe.

It is important that any process developed must be able to remove contaminated materials not only from the surface of metals but also from within those metals which experience homogeneous contamination.

SUMMARY OF THE INVENTION

In view of the above needs, it is an object of this invention to provide a process that decontaminates metals that are homogeneously contaminated with radioactive material.

It is another object of this invention to provide a process for recycling valuable and strategic materials that are contaminated due to exposure to nuclear reactor environments.

An additional object of this invention is to provide a process for minimizing the bulk waste that must be contained as a result of radioactive contamination of reactor material.

A further object of this invention is to provide a process that allows the reprocessing of contaminated materials in a economical manner so that recycling will be cost effective. Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the process of this invention may comprise, first, separating the contaminated material into a first batch that contains metals that can be electrowon from aqueous electrolyte and a second batch that contains metals that cannot be electrowon from aqueous electrolyte, second, melt refining the material thus acquiring preliminary material that is partially decontaminated, third, electrorefining said first batch and melt refining said second batch. This integrated process, using a combination of melt refining and electrorefining, is less expensive and produces a higher quality product than melt refining alone.

DETAILED DESCRIPTION OF THE PREFERRED EMBODIMENT

Figure 1:
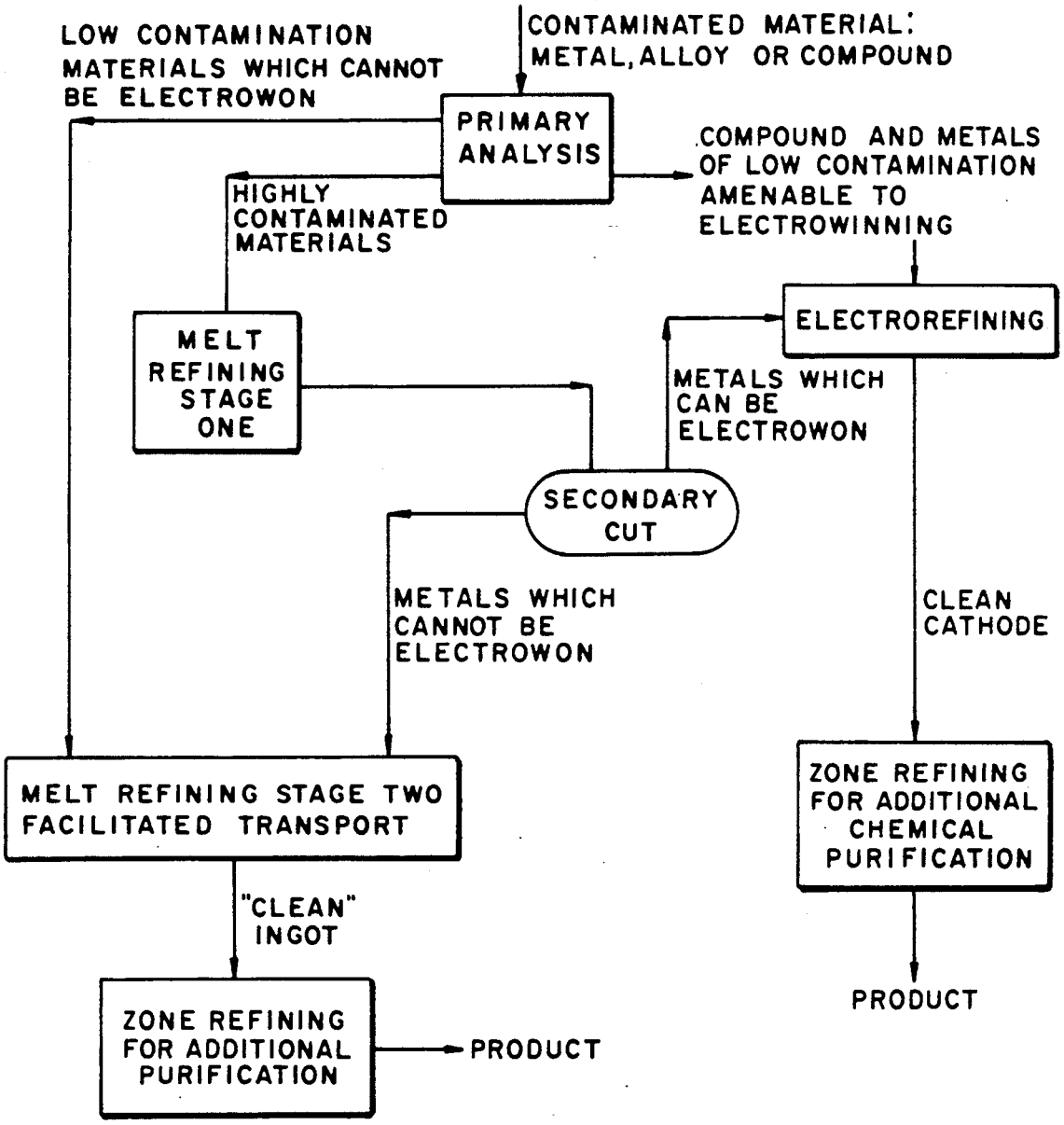
FIG. 1 is a schematic that represents the process steps of the integrated decontamination process for metals.

FIG. 1 outlines the process that comprises basically three procedures: Melt Refining Stage One, an inorganic solvent extraction; Melt Refining Stage Two, a facilitated extraction; and Electrorefining. Before determining which processes are to be used it is necessary to classify the contaminated feedstocks as shown in Table 1.

TABLE 1

MATERIAL CLASSIFICATION FOR DECONTAMINATION PROCESSING

| CLASS | MATERIAL DESCRIPTION | PROCESS OPTION | MATERIAL ORIGIN |
|---|---|---|---|
| 1 | Highly contaminated | Melt Refining Stage One, as a gross reduction in the contamination level. | Outside* |
| 2 | Low contamination metal which can be electrowon from aqueous electrolytes | Electrorefining | Melt Refining Stage One, or outside process** |
| 3 | Low contamination metal compounds which can be electrowon from aqueous electrolytes | Electrorefining | Outside process** |
| 4 | Low contamination metal which cannot be electrowon from aqueous electrolytes | Metal Refining Stage Two with facilitated transport | Melt Refining Stage One, or outside process** |

*Highly contaminated feedstock from outside sources such as military or commercial waste.

**Lowly or moderately contaminated feedstock from outside sources.

The strategy for decontamination entails reducing high levels of contamination in the raw feed, in both quantity and activity, by inorganic solvent extraction in Melt Refining Stage One. Although this extraction is not quantitative, it will reduce reagent consumption, energy costs and radioactivity levels for the more intensive polishing stages. The next step is to eliminate the contamination quantitatively in the polishing steps of Melt Refining Stage Two and Electrorefining.

Selecting the proper polishing step depends on whether the metal can be electrowon from aqueous solution. Electrorefining is the preferred process polishing operation where applicable for several reasons. It is less expensive than melt refining since it operates at a lower temperature, it requires less capital expenditure for equipment and it produces smaller quantities of radionuclide waste which requires disposal. Furthermore, it is quantitative as a function of reduction potential in the electromotive series unlike other processes that leave measurable levels of contaminants behind. Additionally, it provides a more valuable product since it not only decontaminates but also results in a higher purity metal than can be achieved by melt refining.

For metal such as nickel, copper, cobalt and iron which can be electrowon from aqueous solution, decontamination is effective based on their reduction potentials relative to the radionuclides as the series in Table 2 shows.

TABLE 2

REDOX POTENTIAL SERIES FOR AQUEOUS ELECTROREFINING
Oxidation-Reduction Couples in Acid Solutions

| Table Reference Voltage: | $H_2 \rightleftharpoons 2H^+ + 2e^-$ at 0 volts |
|---|---|
| $Li = Li(I) + e^-$ | 3.045 = E |
| $Ra = Ra(II) + 2e^-$ | 2.92 |
| $Ba = Ba(II) + 2e^-$ | 2.90 |
| $Sr = Sr(II) + 2e^-$ | 2.89 |
| $Am = Am(III) + 3e^-$ | 2.32 |
| $Pu = Pu(III) + 3e^-$ | 2.07 |
| $Th = Th(IV) + 4e^-$ | 1.90 |
| $Np = Np(III) + 3e^-$ | 1.86 |
| $U = U(III) + 3e^-$ | 1.80 |
| $Hf = Hf(IV) + 4e^-$ | 1.70 |
| $Ti = Ti(II) + 2e^-$ | 1.63 |
| $Zr = Zr(IV) + 4e^-$ | 1.53 |
| $Cr = Cr(III) + 3e^-$ | 0.75 |
| Voltage of 1 volt | |
| $Fe = Fe(II) + 2e^-$ | 0.44 |
| $Co = Co(II) + 2e^-$ | 0.277 |
| $Ni = Ni(II) + 2e^-$ | 0.25 v |
| $Cu = Cu(II) + 2e^-$ | −0.337 v |

At pH 2.36, −0.8 volts versus the standard calomel electrode, and dilute sulfuric acid, a 95% yield was reported with a 65 minute deposition time for technetium. The same system wins plutonium at a voltage of +.56 volts versus the standard calomel electrode. Therefore, technetium would be won from sulfuric acid solution at 0.71 volts against the hydrogen reference above.

However, many metal such as zirconium, hafnium and titanium, require molten salt electrolysis at 150°-1000° C. Furthermore, insufficient difference in reduction potentials between the titanium group and actinides exists to effect decontamination. Thus, an alternative approach, such as Melt Refining Stage Two with facilitated transport, is required to address these materials. The combination of Electrorefining and Melt Refining Stage Two allows adequate process flexibility to address most metals.

Melt Refining Stage One

Figure 2:
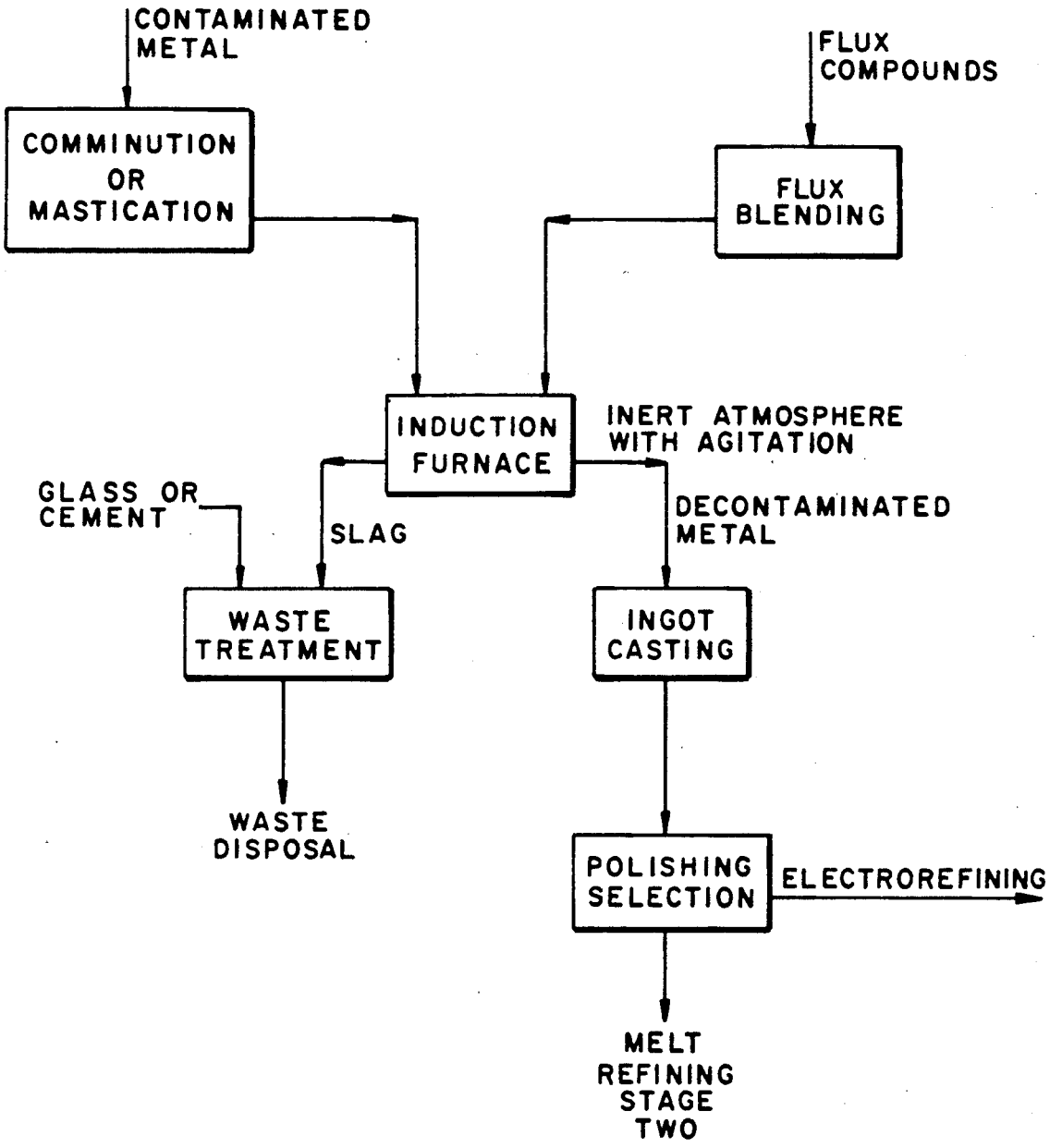
FIG. 2 is a schematic that represents the process steps of Melt Refining Stage One.

Melt Refining Stage One is essentially an inorganic solvent extraction for the primary cut. The extraction occurs between two phases, the raffinate or metal phase and the extract or flux phase. In the absence of an external driving force, such as facilitated transport, an equilibrium distribution is the best that can be expected. Efficiency is determined by that distribution. Since the process does not result in quantitative decontamination, polishing processes, such as Melt Refining Stage Two and Electrorefining, will be required to treat Stage One product to generate decontaminated material that is acceptable for recycle. FIG. 2 is a schematic that describes the process of Melt Refining Stage One.

The feedstock is masticated or comminuted to insure intimate mixing and contact with the flux. Melt Refining Stage One must address a wide range of metals as an initial decontamination stage. Therefore, it must also address a range of operating temperatures and extraction flux compositions. Both are selected as a function of the specific metal to be decontaminated following the guidelines of Table 3.

TABLE 3

TYPICAL STAGE ONE MELT REFINING CONDITIONS

| Metal | Temperature C. | Flux Composition | Typical Equilibrium Coefficient $\lambda$ = [U]slag/[U]melt |
|---|---|---|---|
| Stainless steel | 1600 | 25% CaO, 75% $SiO_2$ | 226 |
| Nickel | 1550 | Borosilicate Glass | 77 |
| Mild steel | mp +100 | 60% CaO, 10% $SiO_2$, 30% $Fe_2O_3$ | 583 |
| Copper | 1250 | 50% $SiO_2$, 25% CaO, 25% $Al_2O_3$ | 718 |
| Aluminum | 1300 | $CaF_2$ | 810 |
| Lead | 1200 | 80% $Na_2CO_3$, 10% $NaNO_3$, 10% PbO | 433 |
| Tin | 1200 | 45% $SiO_2$, 30% CaO, 20% $Al_2O_3$, 5% $Fe_2O_3$ | 392 |
| Zinc | 800 | 50% $NaNO_3$, 45% NaCl, 5% $Fe_2O_3$ | ~8 |
| Lead Tin | | | |
| 80-20 | | 45% $SiO_2$, 30% CaO, 20% $Al_2O_3$, 5% $Fe_2O_3$ | >1500 |
| 50-50 | | — | <~1 |

Flux components from Table 3 are blended separately to appropriate composition. Flux and metal may be mixed in the solid phase and heated to temperature in the furnace. Alternatively, they may be heated to temperature and mixed in the molten state. Agitation and a nonoxidizing atmosphere are required in the melting furnace design for effective phase contact. The slag and melt phases are separated and the melt is cast into ingots for cooling. This stage of extraction can be repeated as required for second or third stages of extraction to reduce the contamination levels further prior to the polishing stages. The extract phase or product flux is likely to be highly contaminated and will require encapsulation on glass or cement for disposal as TRU (transuranic) waste. Table 4 shows typical single stage decontamination results. Stage One Melt Refining will generate Class 2 or Class 4 material.

TABLE 4

TYPICAL MELT REFINING DECONTAMINATION RESULTS

| Material | Product Ingot U Content, ppm* | | | Direct Radiation Alpha d/m/200 cm²** | | |
|---|---|---|---|---|---|---|
| | Avg. | Low | High | Avg. | Low | High |
| Common Steel | 0.4 | 0.00 | 3.50 | 0 | — | — |
| Stainless Steel | 0.6 | 0.01 | 3.20 | 100 | 75 | 120 |
| Ni-bearing Steel | 0.5 | 0.02 | 2.38 | 100 | 100 | 100 |
| Nickel | 1.25 | 0.9 | 1.6 | 120 | 100 | 200 |
| Monel (Ni Alloy) | 0.5 | 0.01 | 4.00 | — | — | — |
| Copper | 0.4 | 0.01 | 2.50 | 100 | 100 | 100 |
| Brass | 0.4 | 0.01 | 2.50 | — | — | — |
| Yellow Brass | 2.1 | 0.30 | 3.20 | — | — | — |
| Bronze | 0.3 | 0.04 | 1.20 | — | — | — |
| Aluminum | 200 | 3 | 1400 | 3870 | 2000 | 6800 |

*Data primarily from Oak Ridge Y-12 plant except for aluminum data which is from Goodyear Atomic Corporation; ppm = parts per million by weight = micrograms per gram.
**Data is primarily from Klevin Harris, Nucleonics 14, No. 4, pp. 93-6 (April 1956). Caution: values may not relate directly with ppm column data; values in disintegrations per minute per 100 square centimeters.

Polishing Steps for Quantitative Decontamination

Electrorefining addresses Class 2 materials with Class 3 materials added. Melt Refining Stage Two addresses Class 4 materials.

Electrorefining

The major feedstocks are Class 2 metals resulting from Melt Refining Stage One. Class 3 materials, contaminated metal compounds whose metals can by won from aqueous electrolytes, are not only decontaminated by the electrorefining process, but are reduced to the base metal increasing product value. Typical feedstock contamination levels are shown in Table 4. The aqueous electromotive series in Table 2 is the basis for such separations.

Electrorefining has two modes of operation. First is the batch mode where contaminated metal dissolves in the electrolyte which serves as both transport medium and metal source. A blank anode distributes the current and the cathodic product is removed. This is the required operating mode to decontaminate metal compounds. The other is the semicontinuous mode where contaminated metal is cast into anodes. The metal is dissolved anodically during the cell operation and plated out at the cathode. In this mode the electrolyte is strictly a transport medium.

Figure 3:
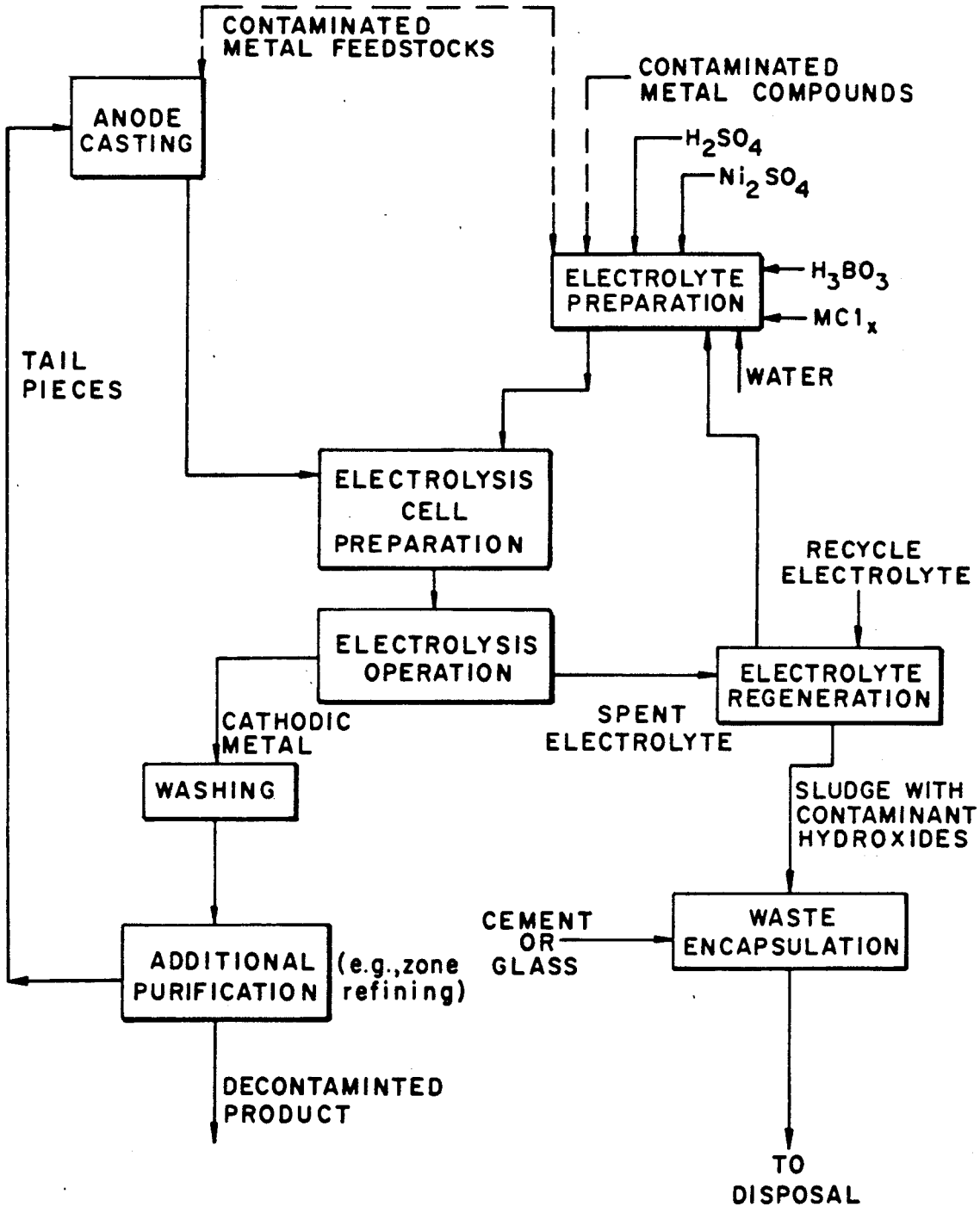
FIG. 3 is a schematic that represents the specific electrorefining process in the semicontinuous operating mode.

The specific process description follows FIG. 3 assuming the semicontinuous operating mode. Contaminated feedstocks are cast into anodes, both for cell operation and for precharging the electrolyte to the ranges shown in Table 5.

TABLE 5

TYPICAL ELECTROREFINING CONDITIONS
General Conditions for Iron, Copper, Cobalt and Nickel

| | | |
|---|---|---|
| pH 2 to 5.2 | Temperature 25 to 65° C. | Voltage less than .5 to .6 volts relative to $H_2$ reduction potential |

Specific Conditions

Current Density: 5-500 amp/dm²

Iron: .44v Ni: .25v Co: .28v Cu: .34 v

Metal Sulfate: 5-60 gm/L as metal Metal Chloride: 0-40 gm/L

Boric Acid: 20-50 gm/L Sodium Sulfate: 0 to 60 gm/L

If the metal compounds are to be decontaminated and won by the system, these are dissolved directly to form the electrolyte feedstock. Anodes, seed cathode, and feedstock electrolyte are changed to the electrorefining cell for operation at conditions at set forth in Table 5. On recovery, the cathode product is washed with a mild acid to remove residual electrolyte adhering to its surface. Results of this process are set forth in Table 6.

TABLE 6

NICKEL PURIFICATION RESULTS BY ELECTROREFINING

Conditions

Temperature: 25° C. Voltage: 1 v

Current Density: .04 amps/cm² Residence Time: 6 hours

Chemical Analysis

| Metals | Target (wt %) | Product (wt %) | Feed (wt %) |
|---|---|---|---|
| Ni | 99.9 | 99.97** | 99.90 |
| Al | NA | 0.01 | 0.01 |
| Co | NA | 0.0001 | 0.0001 |
| Cr | NA | 0.01 | 0.01 |
| Cu | .005 | 0.0067 | 0.0059 |
| Fe | .002 | 0.55* | 0.045 |
| Mn | NA | 0.0007* | 0.0001 |
| Ti | — | 0.019 | 0.044 |

Experimental Conditions

| | | |
|---|---|---|
| Example 1: 25° C. | 1 volt .026 amps/cm² | 6 hours residence time |
| Example 2: 25° C. | 1 volt .040 amps/cm² | 6 hours residence time |

Feedstock Analysis

| Component | Westinghouse AESD (PPM) | Westinghouse Oak Ridge (PPM) | Product Results Example 1 (PPM) | Product Results Example 2 (PPM) |
|---|---|---|---|---|
| $Np^{237}$ | BDL | BDL | BDL | BDL |
| $Pu^{239}$ | BDL | BDL | BDL | BDL |
| $Tc^{99}$ | .31 ± .01 | .19 | .65 ± .01 | .42 ± .01 |
| $U^{235}$ | BDL | 1.04% U | BDL | BDL |
| $U_{total}$ | 1.2 ± .3 | 13 | *** | BDL |

*Presumed to be due to the partial dissolution of stainless electrode leads resulting from electrolyte splashing and washing across the electrodes.
**Eliminates the iron and manganese impurities resulting from splash.
***Not available due to insufficient sample
NA - Not Analyzed
BDL - Below Detectable Limit At this stage the metal product may be recycled for other uses or subjected to an additional purification process such as zone melting to improve its chemical purity. Metal tails from this zone refining process which have already been decontaminated can be sold as a lower purity grade or recycled to the anode casting process.

The spent electrolyte is partially neutralized to precipitate the metal contaminants as a sludge. The sludge is filtered, dewatered, and encapsulated for disposal in either cement or glass. The filtrate is passed through a demineralizer and recycled to the process.

Melt Refining Stage Two: Facilitated Transport Extraction

Stage Two Melt Refining will address Class 4 metals such as zirconium, aluminum, titanium, hafnium and others which cannot be won from aqueous electrolytes, achieving the quantitative removal of contaminants by facilitated transport extraction. Here alloying elements are intentionally added to the melt. Their objective is to complex the radionuclides present in the melt, converting them to species more readily extracted by the flux. This process both shifts equilibrium and improves transport kinetics.

Figure 4:
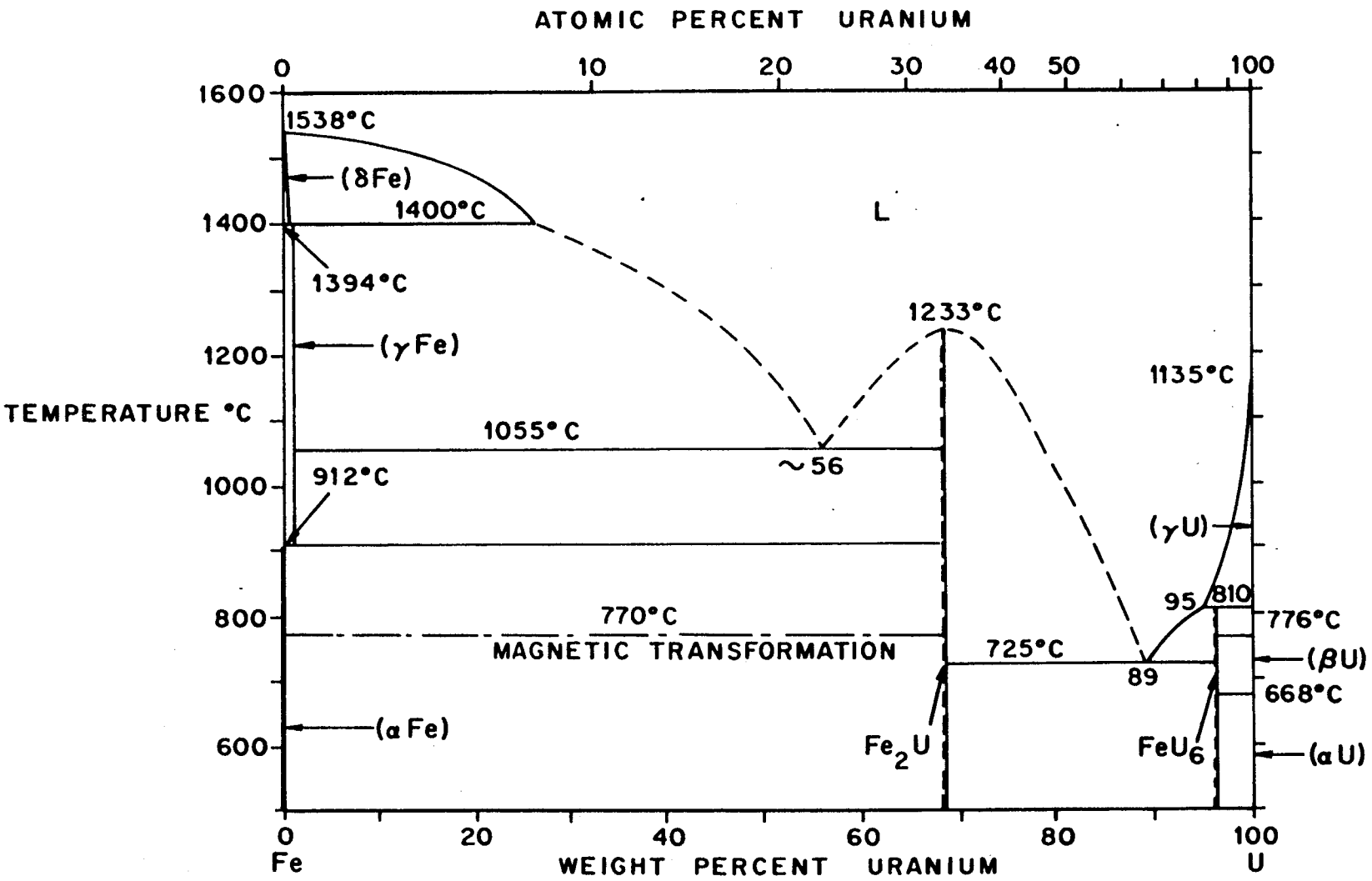
FIG. 4 is a eutectic diagram of the iron-uranium system.

A primary alloying agent is iron, the behavior of which is depicted in FIG. 4. Other elements such as zirconium, titanium, niobium or others can be added to improve system performance and product purity. The metal can be added to the melt in pure form or its oxide may be reduced in the furnace carbothermically by reaction with carbon at furnace temperature. The scrubbing flux may be selected from the list of candidates in Table 4, or others may be used. For example, borosilicate glass is an effective flux for nickel decontamination in Stage One Melt Refining. $CaO/Fe_2O_3/SiO_2$ is preferred for Stage Two decontamination.

Figure 5:
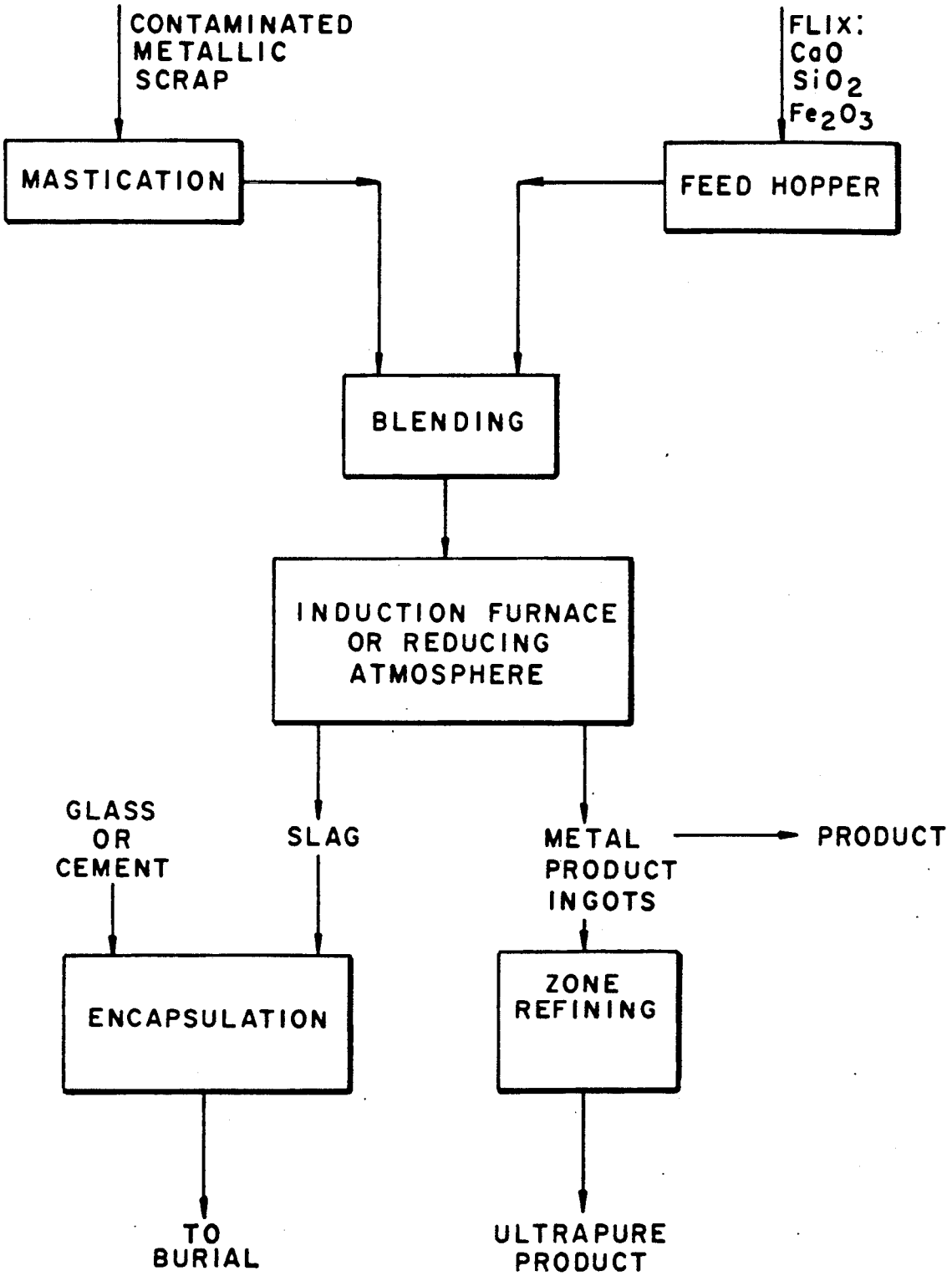
FIG. 5 is a schematic that represents a detailed description of the Stage Two Melt Refining Process.

FIG. 5 is a detailed description of the Stage Two Melt Refining Process. Table 7 demonstrates its efficiency for the specific case of nickel decontamination relative to the Stage One Melt Refining.

TABLE 7

DECONTAMINATION PERFORMANCE IN MELT REFINING FOR NICKEL

| | Feedstock Analysis | Experimental Results Temperature ≧1550° C. Westinghouse | |
|---|---|---|---|
| Component | DOE (ppm) | Stage One (ppm) | Stage Two (ppm) |
| $Np^{237}$ | BDL | BDL | BDL |
| $Pu^{239}$ | BDL | BDL | BDL |
| $Tc^{99}$ | .19 | .25 | .35 |
| $U^{235}$ | BDL | BDL | BDL |
| $U_{total}$ | 1.3 | 1.1 ± .5 | BDL |
| Nl | balance | balance | balance |
| Al | <0.01 | <0.01 | <0.01 |
| Co | <0.0001 | <0.0001 | <0.0001 |
| Cr | <0.01 | <0.01 | <0.01 |
| Cu | <0.0059 | 0.0057 | 0.0058 |
| Fe | 0.045 | 0.048 | 0.93 |
| Mn | <0.0001 | 0.0003 | 0.0002 |
| Ti | 0.044 | 0.024 | 0.013 |
| Flux | | Borosilicate | $CaO/Fe_2O_3/SiO_2$ |
| λw** | | ~2.5 | 3.4/BDL |
| Flux Interaction with Crucible | | Negligible | Significant Producing Metallic Iron |

BDL = Below Detectable Limits 0
λw = Conc. Slag/Conc. Melt

In the process contaminated metal is comminuted in a mastication process and blended with flux and alloying agent. Alternatively metal, flux and alloy agent could be melted individually, brought to the same temperature and blended in the furnace. The flux mass ranges from 10% to 200% of the metal mass. The high flux level favors more effective decontamination by diluting the extract phase. The lower level reduces the amount of waste slag which must be treated in waste management. The alloy reagent should be present as 110% or more of the theoretical requirement, based on the stoichiometry of the existing contaminants.

The materials are fired in an induction furnace for 10–60 minutes. Agitation is recommended; an inert or reducing atmosphere is required. The furnace temperature is a direct function of the melting points of the metal, flux, and alloy reagent. In the case of the system Ni, $Fe_2O_3$-CaO-$SiO_2$ and iron metal, the recommended temperature is in excess of 1550° to 1600° C.

On cooling the furnace charge is tapped and separated. The slag proceeds to a glass or cement encapsulation process for waste management. The metal melt is poured into molds to form ingot. Finally an additional stage of zone refining can be applied to this stage as well for the specific purpose of improving chemical purity of the product.

All wastes from this process have concentrated radionuclides as a result of the decontamination process. These wastes consist of Stage One Melt Refining borosilicate flux, Stage Two Melt Refining $Fe_2O_3$-$SiO_2$-CaO flux, and electrorefining spent electrolyte sludge. These wastes are encapsulated in glass or cement as required by their level of residual contamination.

We claim:

1. A process for removing radioactive contamination from metals comprising:

a first step comprising melt refining contaminated material resulting in a metal phase and a flux phase;

separating said metal phase into a first batch and a second batch, said first batch being targeted for removal of specific metals that can be electrowon from aqueous electrolyte and said second batch being targeted for removal of specific metals that cannot be electrowon from aqueous electrolyte;

a second step comprising electrorefining said first batch; and a third step comprising melt refining said second batch.

* * * * *